US012647990B2

(12) United States Patent
Bai et al.

(10) Patent No.: US 12,647,990 B2
(45) Date of Patent: Jun. 2, 2026

(54) DEFAULT CONDITION FOR UNIFIED TCI STATE

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 442 days.

(21) Appl. No.: 17/813,263

(22) Filed: Jul. 18, 2022

(65) Prior Publication Data

US 2024/0023111 A1 Jan. 18, 2024

(51) Int. Cl.
*H04W 4/00* (2018.01)
*H04W 72/044* (2023.01)
*H04W 72/23* (2023.01)

(52) U.S. Cl.
CPC ......... *H04W 72/23* (2023.01); *H04W 72/044* (2013.01)

(58) Field of Classification Search
CPC ............................ H04W 72/12; H04W 72/044
See application file for complete search history.

(56) References Cited

U.S. PATENT DOCUMENTS

| | | | | | |
|---|---|---|---|---|---|
| 2019/0239212 | A1* | 8/2019 | Wang | ..................... | H04L 5/0051 |
| 2020/0351892 | A1* | 11/2020 | Yi | .......................... | H04L 5/0092 |

600

| | | | | | |
|---|---|---|---|---|---|
| 2021/0051667 | A1* | 2/2021 | Yang | ...................... | H04W 72/23 |
| 2021/0185686 | A1* | 6/2021 | Bai | ....................... | H04L 25/0224 |
| 2021/0250152 | A1* | 8/2021 | Zhang | ................... | H04B 7/0408 |
| 2022/0210818 | A1* | 6/2022 | Cirik | ...................... | H04W 72/23 |
| 2022/0225362 | A1* | 7/2022 | Yi | ......................... | H04W 72/046 |
| 2022/0264475 | A1* | 8/2022 | Yi | ......................... | H04W 72/046 |
| 2022/0287013 | A1* | 9/2022 | Farag | .................... | H04L 5/0035 |
| 2022/0294509 | A1* | 9/2022 | Xu | ......................... | H04W 72/046 |
| 2022/0361218 | A1* | 11/2022 | He | ......................... | H04L 5/0053 |
| 2022/0417909 | A1* | 12/2022 | Zhu | ......................... | H04L 5/005 |
| 2023/0039425 | A1* | 2/2023 | Liu | ....................... | H04W 72/02 |
| 2023/0141660 | A1* | 5/2023 | Matsumura | ........... | H04W 16/28 |
| | | | | | 370/329 |

(Continued)

FOREIGN PATENT DOCUMENTS

WO 2021205421 A1 10/2021

OTHER PUBLICATIONS

International Search Report and Written Opinion—PCT/US2023/023750—ISA/EPO—Sep. 22, 2023.

*Primary Examiner* — Elisabeth Benoit Magloire
(74) *Attorney, Agent, or Firm* — Procopio, Cory, Hargreaves & Savitch LLP

(57) ABSTRACT

Apparatus, methods, and computer program products for wireless communication are provided. An example method may include receiving downlink control information (DCI) indicating at least a first transmission configuration indicator (TCI) state from a network entity at a first time. The example method may further include applying a second TCI state or a third TCI state to receive a scheduled downlink transmission based on a difference between the first time and a second time associated with the scheduled downlink transmission, where the difference is smaller than a threshold and based on a default TCI state condition.

27 Claims, 9 Drawing Sheets

602

Receive downlink control information (DCI) indicating a first transmission configuration indicator (TCI) state from a network entity at a first time

604

Apply a second TCI state or a third TCI state to receive a scheduled downlink transmission based on a difference between the first time and a second time associated with the scheduled downlink transmission is smaller than a threshold and based on a default TCl state rule

(56)          References Cited

U.S. PATENT DOCUMENTS

2023/0254097  A1*   8/2023   Zhou ................. H04W 72/1273
                                                      370/329
2023/0328672  A1*  10/2023   Damnjanovic ... H04W 56/0045
                                                      370/329
2023/0379900  A1*  11/2023   Matsumura ........ H04B 7/06968
2023/0397204  A1*  12/2023   Yuan ...................... H04B 7/088
2024/0187199  A1*   6/2024   Gao ...................... H04L 5/0094
2024/0214171  A1*   6/2024   Yuan .................... H04L 5/0048
2024/0414735  A1*  12/2024   Yuan ...................... H04B 7/088
2025/0016868  A1*   1/2025   Matsumura .......... H04B 7/0695
2025/0167953  A1*   5/2025   Guan ................. H04B 7/06952

* cited by examiner

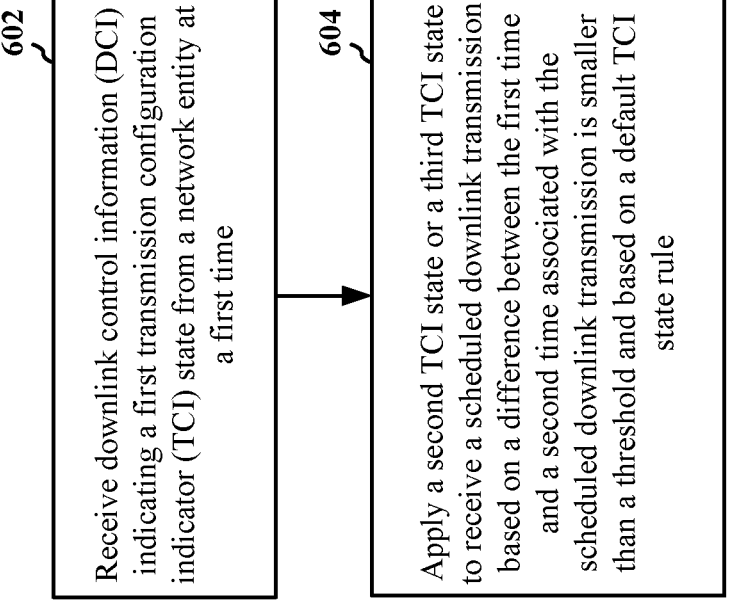

602

Receive downlink control information (DCI) indicating a first transmission configuration indicator (TCI) state from a network entity at a first time

604

Apply a second TCI state or a third TCI state to receive a scheduled downlink transmission based on a difference between the first time and a second time associated with the scheduled downlink transmission is smaller than a threshold and based on a default TCI state rule

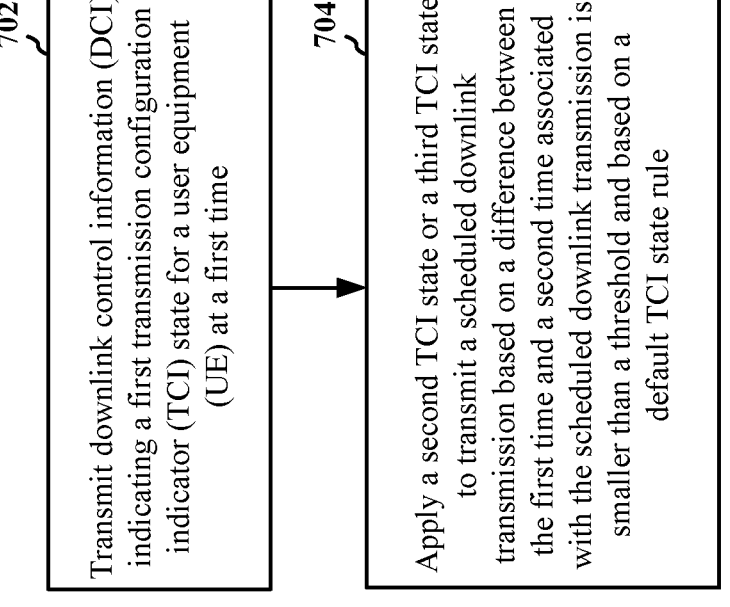

702

Transmit downlink control information (DCI) indicating a first transmission configuration indicator (TCI) state for a user equipment (UE) at a first time

704

Apply a second TCI state or a third TCI state to transmit a scheduled downlink transmission based on a difference between the first time and a second time associated with the scheduled downlink transmission is smaller than a threshold and based on a default TCI state rule

DEFAULT CONDITION FOR UNIFIED TCI STATE

TECHNICAL FIELD

The present disclosure relates generally to communication systems, and more particularly, to wireless communication systems with transmission configuration indicator (TCI) states.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to receive downlink control information (DCI) indicating at least a first transmission configuration indicator (TCI) state from a network entity at a first time. The memory and the at least one processor coupled to the memory may be further configured to apply a second TCI state or a third TCI state to receive a scheduled downlink transmission based on a difference between the first time and a second time associated with the scheduled downlink transmission is smaller than a threshold and based on a default TCI state condition.

In another aspect of the disclosure, a method, a computer-readable medium, and an apparatus at a network entity are provided. The apparatus may include a memory and at least one processor coupled to the memory. The memory and the at least one processor coupled to the memory may be configured to transmit downlink control information (DCI) indicating at least a first transmission configuration indicator (TCI) state for a user equipment (UE) at a first time. The memory and the at least one processor coupled to the memory may be further configured to apply a second TCI state or a third TCI state to transmit a scheduled downlink transmission based on a difference between the first time and a second time associated with the scheduled downlink transmission is smaller than a threshold and based on a default TCI state condition.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 6 is a flowchart of a method of wireless communication.

FIG. 7 is a flowchart of a method of wireless communication.

DETAILED DESCRIPTION

Figure 1:
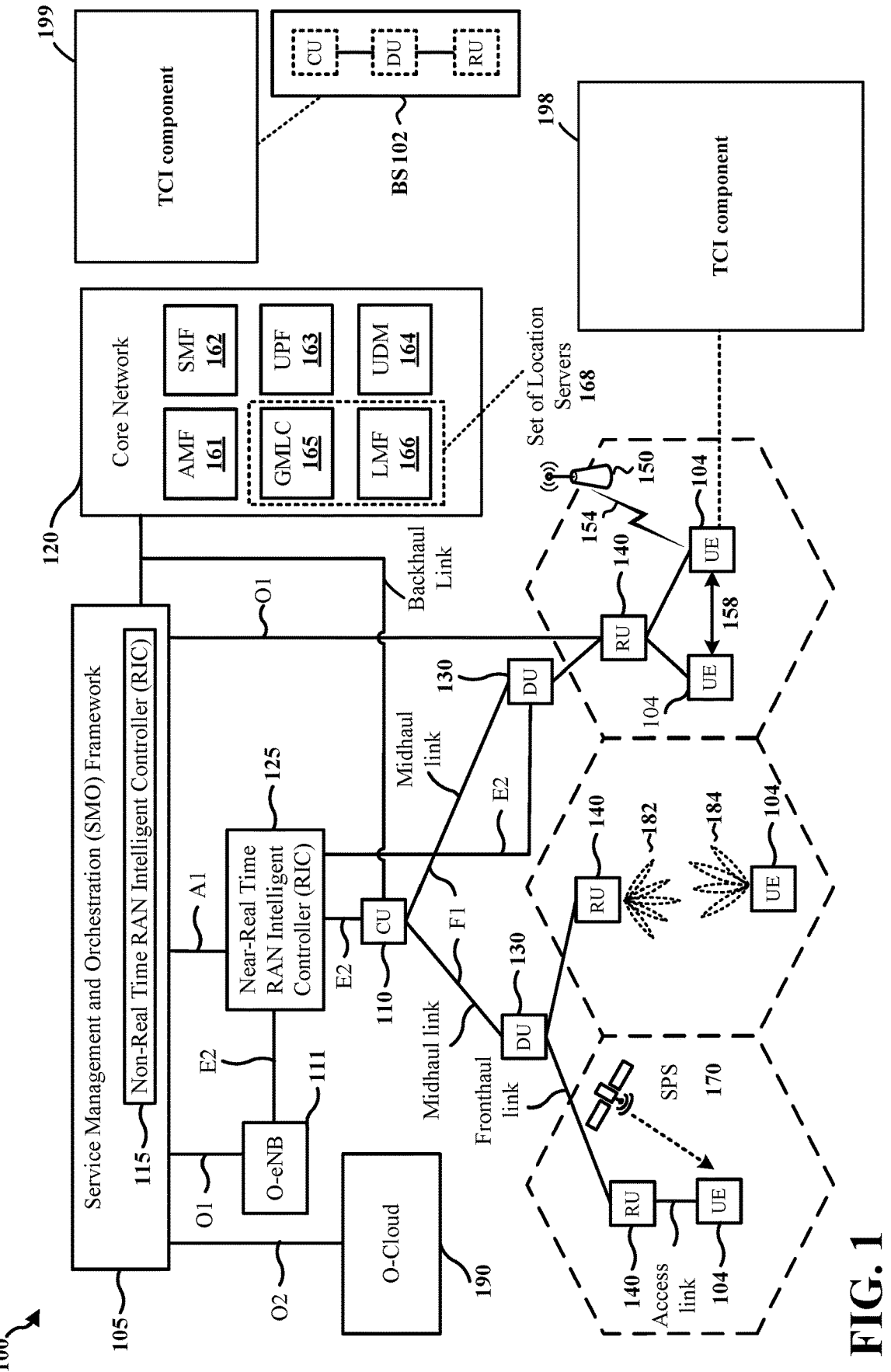
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a TCI component 198. In some aspects, the TCI component 198 may be configured to receive downlink control information (DCI) indicating at least a first transmission configuration indicator (TCI) state from a network entity at a first time. In some aspects, the TCI component 198 may be further configured to apply a second TCI state or a third TCI state to receive a scheduled downlink transmission based on a difference between the first time and a second time associated with the scheduled downlink transmission is smaller than a threshold and based on a default TCI state condition.

In certain aspects, the base station 102 may include a TCI component 199. In some aspects, the TCI component 199 may be configured to transmit downlink control information (DCI) indicating at least a first transmission configuration indicator (TCI) state for a user equipment (UE) at a first time. In some aspects, the TCI component 199 may be further configured to apply a second TCI state or a third TCI state to transmit a scheduled downlink transmission based on a difference between the first time and a second time associated with the scheduled downlink transmission is smaller than a threshold and based on a default TCI state condition.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 2:
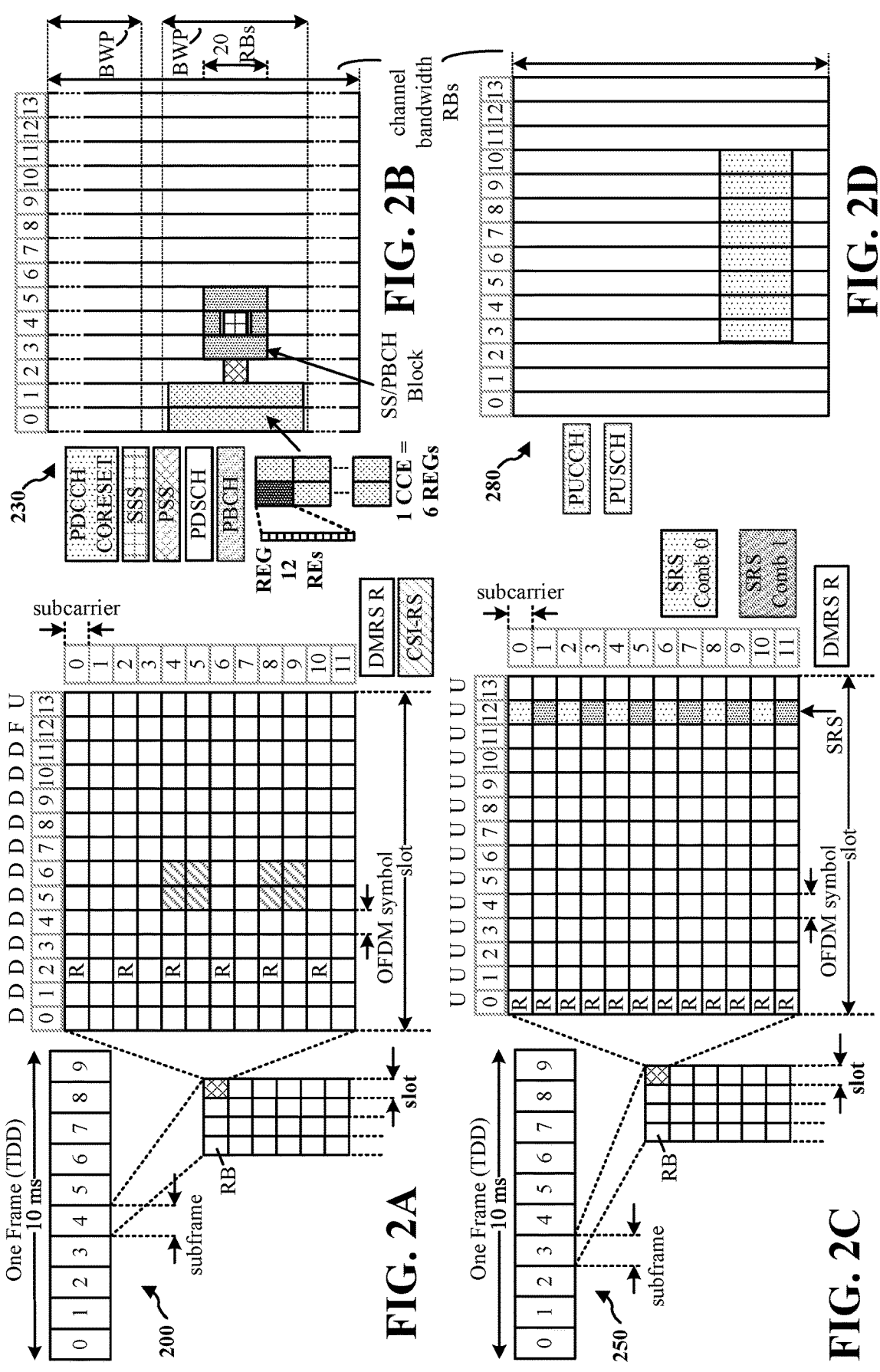
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI).

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS)

may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (B SR), a power headroom report (PHR), and/or UCI.

Figure 3:
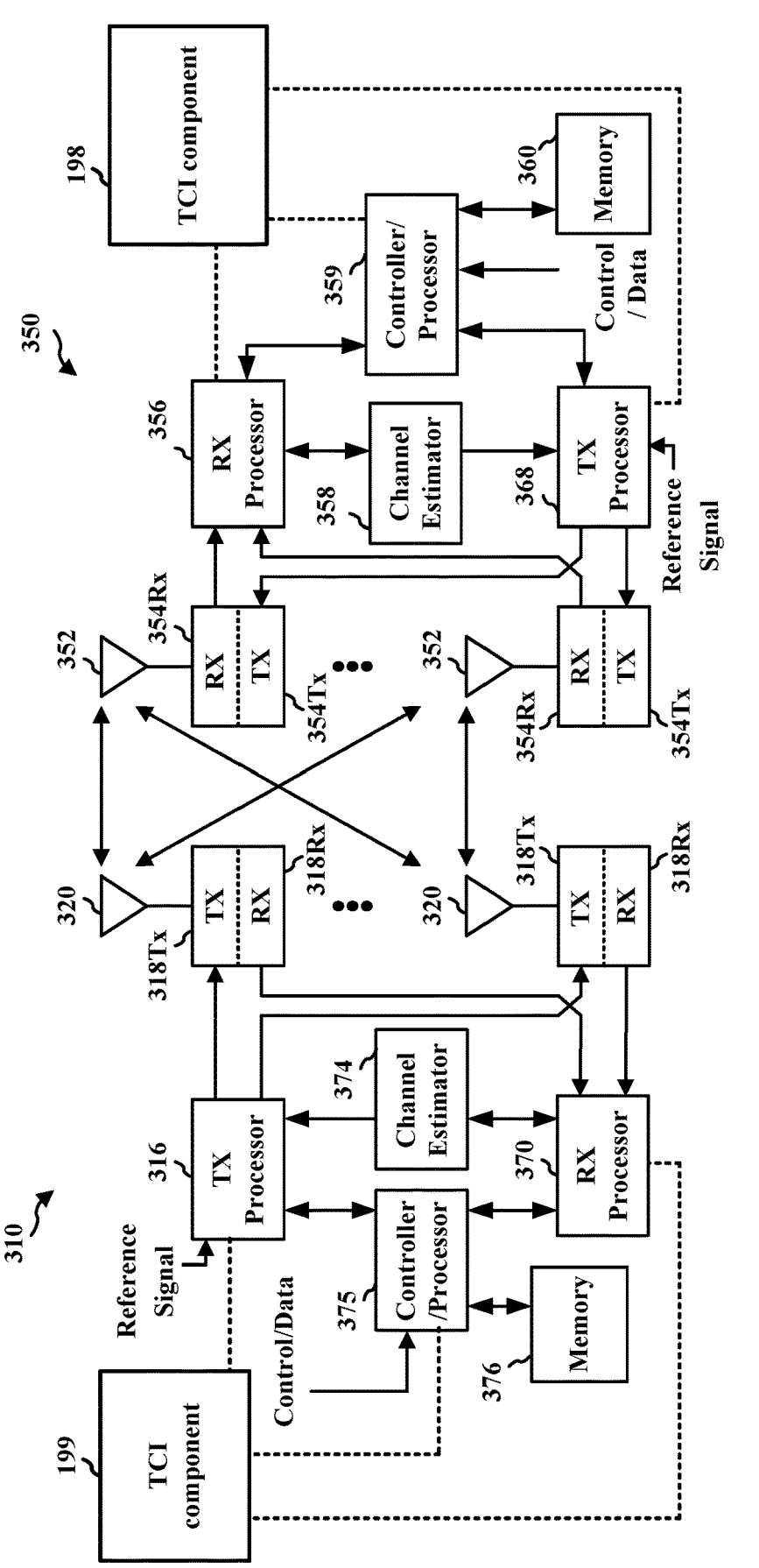
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with TCI component 198 of FIG. 1.

At least one of the TX processor 316, the RX processor 370, and the controller/processor 375 may be configured to perform aspects in connection with TCI component 199 of FIG. 1.

Figure 4:
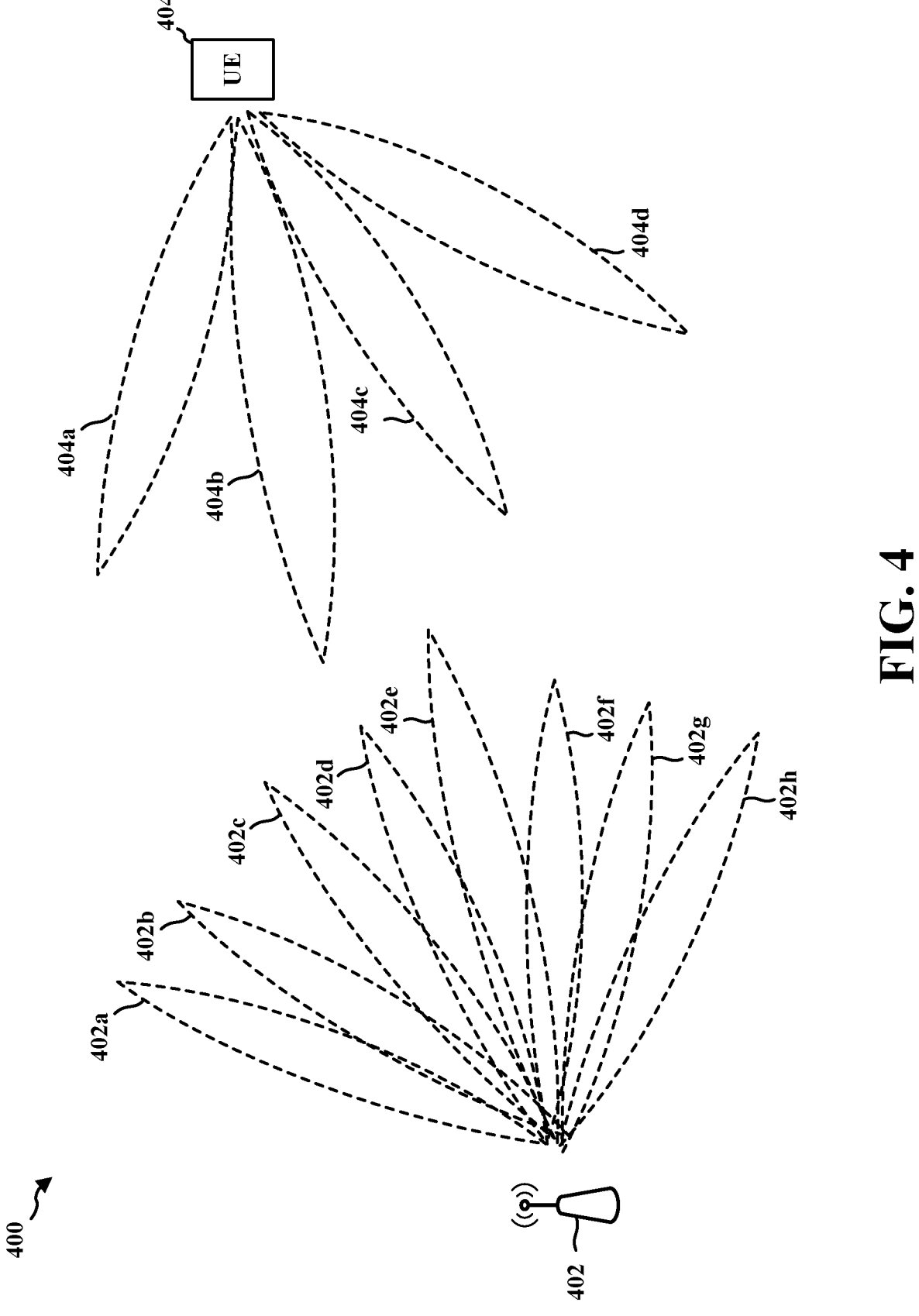
FIG. 4 is a diagram illustrating a base station in communication with a UE via a set of beams.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same. The term beam may be otherwise referred to as "spatial filter." Beamforming may be otherwise referred to as "spatial filtering."

In response to different conditions, the UE 404 may determine to switch beams, e.g., between beams 402a-402h. The beam at the UE 404 may be used for reception of downlink communication and/or transmission of uplink communication. In some examples, the base station 402 may send a transmission that triggers a beam switch by the UE 404. A TCI state may include quasi-co-location (QCL) information that the UE can use to derive timing/frequency error and/or transmission/reception spatial filtering for transmitting/receiving a signal. Two antenna ports are said to be quasi co-located if properties of the channel over which a symbol on one antenna port is conveyed can be inferred from the channel over which a symbol on the other antenna port is conveyed. The base station may indicate a TCI state to the UE as a transmission configuration that indicates QCL relationships between one signal (e.g., a reference signal) and the signal to be transmitted/received. For example, a TCI state may indicate a QCL relationship between DL RSs in one RS set and PDSCH/PDCCH DM-RS ports. TCI states can provide information about different beam selections for the UE to use for transmitting/receiving various signals. For example, the base station 402 may indicate a TCI state change, and in response, the UE 404 may switch to a new beam (which may be otherwise referred to as performing a beam switch) according to the new TCI state indicated by the base station 402.

In some wireless communication systems, such as a wireless communication system under a unified TCI framework, a pool of joint DL/UL TCI states may be used for joint DL/UL TCI state updates for beam indication. For example, the base station 402 may transmit a pool of joint DL/UL TCI states to the UE 404. The UE 404 may determine to switch transmission beams and/or reception beams based on the joint DL/UL TCI states. In some aspects, the TCI state pool for separate DL and UL TCI state updates may be used. In some aspects, the base station 402 may use RRC signaling to configure the TCI state pool. In some aspects, the joint TCI may or may not include UL specific parameter(s) such as UL PC/timing parameters, PLRS, panel-related indication, or the like. If the joint TCI includes the UL specific parameter(s), the parameters may be used for the UL transmission of the DL and UL transmissions to which the joint TCI is applied. A TCI state under the unified TCI framework may be referred to as "unified TCI state." A TCI state not under the unified TCI framework may be referred to as "non-unified TCI state" and may be a DL TCI state.

Under a unified TCI framework, different types of unified TCI states may be indicated. For example, a first type of TCI may be a joint DL/UL TCI state to indicate a beam for at least one DL channel or RS and at least one UL channel or RS. A second type of TCI may be a separate DL (e.g., separate from UL) TCI state to indicate a beam for at least one DL channel or RS. A second type of TCI may be a separate UL TCI state to indicate a beam for at least one UL channel/RS. An example RS may be an SSB, a tracking reference signal (TRS) and associated CSI-RS for tracking, a CSI-RS for beam management, a CSI-RS for CQI management, a DM-RS associated with non-UE-dedicated reception on PDSCH and a subset (which may be a full set) of control resource sets (CORESET s), or the like.

A TCI state may be defined to represent at least one source RS to provide a reference (e.g., UE assumption) for determining quasi-co-location (QCL) or spatial filters. For example, a TCI state may define a QCL assumption between a source RS and a target RS.

A UE may receive a MAC control element (MAC-CE) activating one or more (e.g., one to eight) TCI state codepoint associated with one or more TCI states; and then receive downlink control information (DCI) indicating one TCI state codepoint associated with one TCI state of the one or more TCI states (which may be alternatively referred to as indicating one TCI state) and the UE may keep using the one TCI state until a separate DCI indicating another TCI state is received. Different formats of DCI may provide different scheduling. For example, DCI format 0_0 may be a fallback format that may provide scheduling of a PUSCH in one cell. DCI format 0_1 may be a non-fallback format that may provide scheduling of a PUSCH in one cell. DCI format 1_0 may be a fallback DCI format used for allocating downlink resources for a PDSCH. DCI format 1_1 may be a non-fallback DCI format used for allocating downlink resources for a PDSCH. DCI format 2_0 may be used for the notification of slot format information (to dynamically change the slot format). DCI format 2_1 may be used for notifying the PRB(s) and OFDM symbol(s) where a UE may assume no transmission is intended for the UE. DCI format 2_2 may be used for the transmission of transmit power control (TPC) commands for a PUCCH and a PUSCH. DCI format 2_3 may be used for the transmission of a group of TPC commands for SRS transmissions by one or more UEs. DCI format 2_4 may be used for, such as dedicated for, providing cancellation of a UL transmission. In some aspects, to indicate one TCI state codepoint representing (1) a pair of UL TCI state and DL TCI state or (2) a single DL TCI state, UL TCI state, or joint TCI state, DCI format 1_1 or format 1_2 may be used. In some aspects, with DL assignment, to indicate the TCI state, a TCI field in the DCI may be representing a TCI state ID.

Table 2 below may provide example of channels/RSs associated with different types of TCI states (once activated):

TABLE 2

| TCI state type | Associated with channel/RS | Associated with channel/RS that may be configured (e.g., in RRC) |
|---|---|---|
| Separate DL TCI | UE dedicated PDCCH and PDSCH | Non-UE dedicated PDCCH and PDSCH, aperiodic (AP) CSI-RS for CSI, AP CSI RS for beam management |
| Separate UL TCI | UE dedicated PUSCH (dynamic grant and configured grant based) and PUCCH | SRS for CB/NCB/Antenna switching (AS), AP SRS for BM |
| Joint DL and UL TCI | UE dedicated PDCCH and PDSCH or UE dedicated PUSCH (dynamic grant and configured grant based) and PUCCH | Non-UE dedicated PDCCH and PDSCH, AP CSI-RS for CSI, AP CSI RS for beam management. SRS for codebook based (CB)/non-codebook based (NCB)/Antenna switching (AS), AP SRS for beam management |

Before receiving a TCI state, a UE may assume that the antenna ports of one DM-RS port group of a PDSCH are spatially quasi-co-located (QCLed) with an SSB determined in the initial access procedure with respect to one or more of: a Doppler shift, a Doppler spread, an average delay, a delay spread, a set of spatial Rx parameters, or the like. After receiving the new TCI state, the UE may assume that the antenna ports of one DM-RS port group of a PDSCH of a serving cell are QCLed with the RS(s) in the RS set with respect to the QCL type parameter(s) given by the indicated TCI state. Regarding the QCL types, QCL type A may include the Doppler shift, the Doppler spread, the average delay, and the delay spread; QCL type B may include the Doppler shift and the Doppler spread; QCL type C may include the Doppler shift and the average delay; and QCL type D may include the spatial Rx parameters (e.g., associated with beam information such as beamforming properties for finding a beam). In some aspects, a maximum number of TCI states may be 128.

To accommodate situations where beam indication for UL and DL are separate, two separate TCI states (one for DL and another one for UL) may be utilized. For a separate DL TCI, the source reference signal(s) in M (M being an integer) TCIs may provide QCL information at least for UE-dedicated reception on PDSCH and for UE-dedicated reception on all or subset of CORESETs in a CC. For a separate UL TCI, the source reference signal(s) in N (N being an integer) TCIs provide a reference for determining UL transmission (TX) spatial filter(s) at least for dynamic-grant or configured-grant based PUSCH and all or subset of dedicated PUCCH resources in a CC.

In some aspects, the UL TX spatial filter may also apply to all SRS resources in resource set(s) configured for antenna switching, codebook-based (CB), or non-codebook-based (NCB) UL transmissions.

In some aspects, each of the following DL RS s may share the same indicated TCI state as UE-dedicated reception on PDSCH and for UE-dedicated reception on all or subset of CORESETs in a CC: CSI-RS resources for CSI, some or all CSI-RS resources for beam management, CSI-RS for tracking, and DM-RS(s) associated with UE-dedicated reception on PDSCH and all/subset of CORESETs. Some SRS resources or resource sets for beam management may share the same indicated TCI state as dynamic-grant/configured-grant based PUSCH, all or subset of dedicated PUCCH resources in a CC. In some wireless communication systems, several QCL rules and/or conditions may be defined. For example, a first rule and/or condition may define that TCI to DM-RS of UE dedicated PDSCH and PDCCH may not have SSB as a source RS to provide QCL type D information. A second rule and/or condition may define that TCI to some DL RS such as CSI-RS may have SSB as a source RS to provide QCL type D information. A third rule may define that TCI to some UL RS such as SRS can have SSB as a source RS to provide spatial filter information.

In some wireless communication systems, to facilitate a TCI state ID update and activation to provide QCL information at least for UE-dedicated PDCCH/PDSCH (e.g., common to UE-dedicated PDCCH and UE-dedicated PDSCH) or UL TX spatial filter(s) at least for UE-dedicated PUSCH/PUCCH across a set of configured CCs/BWPs (e.g., common to multiple PUSCH/PUCCH across configured CCs/BWPs), several configurations may be provided. For example, the RRC-configured TCI state pool(s) may be configured as part of the PDSCH configuration (such as in a PDSCH-Config parameter) for each BWP or CC. The RRC-configured TCI state pool(s) may be absent in the PDSCH configuration for each BWP/CC, and may be replaced with a reference to RRC-configured TCI state pool(s) in a reference BWP/CC. For a BWP/CC where the PDSCH configuration contains a reference to the RRC-configured TCI state pool(s) in a reference BWP/CC, the UE may apply the RRC-configured TCI state pool(s) in the reference BWP/CC. When the BWP/CC identifier (ID) (e.g., for a cell) for QCL-Type A or Type D source RS in a QCL information (such as in a QCL info parameter) of the TCI state is absent, the UE may assume that QCL-Type A or Type D source RS is in the BWP/CC to which the TCI state applies. In addition, a UE may report a UE capability indicating a maximum number of TCI state pools that the UE can support across BWPs and CCs in a band.

In some aspects, a UE may receive a signal, from a base station, configured to trigger a TCI state change via, for example, a medium access control (MAC) control element (CE) (MAC-CE), a DCI, or a radio resource control (RRC) signal. The TCI state change may cause the UE to find the best or most suitable UE receive beam corresponding to the TCI state indicated by the base station, and switch to such beam. Switching beams may allow for an enhanced or improved connection between the UE and the base station by ensuring that the transmitter and receiver use the same configured set of beams for communication. A DCI may include one or more TCI codepoints that may each represent one or more TCI states.

In some aspects, a spatial relation change, such as a spatial relation update, may trigger the UE to switch beams. Beamforming may be applied to uplink channels, such as a PUSCH, a PUCCH, or an SRS, or downlink channels, such as PDCCH, PDSCH, or the like. Beamforming may be based on configuring one or more spatial relations between the uplink and downlink signals. Spatial relation indicates that a UE may transmit the uplink signal using the same beam used for receiving the corresponding downlink signal.

In some aspects, joint TCI for DL and UL may be supported. The source reference signal(s) in M (M being a positive integer) TCIs may provide QCL information at least for UE-dedicated reception on PDSCH and all or subset of control resource sets (CORESETs) in a component carrier (CC). The source reference signal(s) in N (N being a positive integer) TCIs may provide a reference for determining common UL TX spatial filter(s) at least for dynamic-grant/configured-grant based PUSCH, all or subset of dedicated PUCCH resources in a CC. The UL TX spatial filter may also apply to all SRS resources in resource set(s) configured for antenna switching, codebook-based, or non-codebook-based UL transmissions.

In some wireless communication systems, two separate TCI states, one for DL and one for UL, may be used. For the separate DL TCI, the source reference signal(s) in M TCIs may provide QCL information at least for UE-dedicated reception on PDSCH and for UE-dedicated reception on all or subset of CORESETs in a CC. For the separate UL TCI, the source reference signal(s) in N TCIs may provide a reference for determining common UL TX spatial filter(s) at least for dynamic-grant/configured-grant based PUSCH, all or subset of dedicated PUCCH resources in a CC. The UL TX spatial filter can also apply to all SRS resources in resource set(s) configured for antenna switching, codebook-based, or non-codebook-based UL transmissions.

Figure 5:
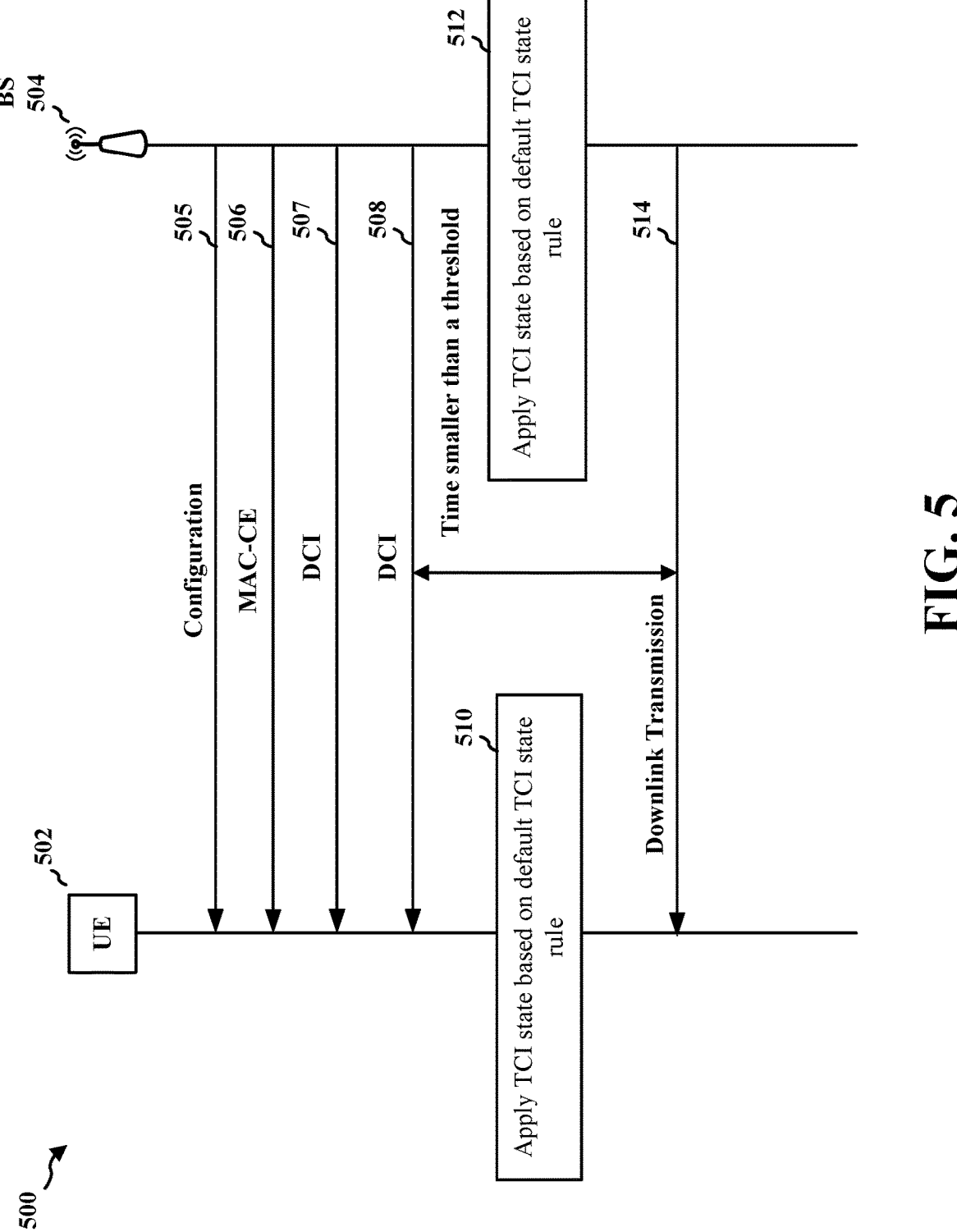
FIG. 5 is a diagram illustrating example communications between a network entity and a UE.

FIG. 5 is a diagram 500 illustrating communications between a UE 502 and a network entity 504 (e.g., a base station). The network entity 504 may be a network node. A network node may be implemented as an aggregated base station, as a disaggregated base station, an integrated access and backhaul (IAB) node, a relay node, a sidelink node, or the like. A network entity can be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC.

As illustrated in FIG. 5, the UE 502 may receive a MAC-CE 506 activating one or more (e.g., one to eight) TCI state codepoint associated with one or more TCI states. After receiving the MAC-CE 506, the UE 502 may then receive DCI 507 indicating one TCI state codepoint associated with at least one TCI state of the one or more TCI states (which may be alternatively referred to as indicating at least one TCI state). The UE 502 may keep using the one TCI state until a separate DCI (e.g., 508) indicating another TCI state is received (in cases where the one TCI state is a unified TCI state). In some aspects, the DCI 508 may indicate a non-unified TCI state and the UE 502 might not keep using the one TCI state until the separate DCI (e.g., 508) indicating another TCI state is received. In some aspects, the DCI 508 may indicate a non-unified TCI state or a unified TCI state. If the DCI 508 indicates a unified TCI state, the UE 502 may apply the TCI state indicated by the DCI 508 for subsequent transmissions (that may or may not be scheduled by the DCI 508) until another DCI is received. In some aspects, the DCI 508 may be received and the DCI 507 may not be present.

After receiving the DCI 508, The UE 502 may prepare RX configuration for the TCI state indicated in the DCI 508 and such preparation may take time. In some aspects, the scheduling offset between the DCI 508 and a scheduled downlink transmission 514 (e.g., with scheduled PDSCH/AP-CSI) scheduled by the DCI 508 may be smaller than a threshold. In some aspects, the threshold may be based on the time that the UE 502 may use for preparing RX configuration for the TCI state indicated in the DCI 508. Because the scheduling offset is smaller than the threshold, the UE 502 might not be able to apply the TCI state (and switch to associated beam) indicated in the DCI 508 for the scheduled downlink transmission 514. The terms "use/using TCI state" and "apply/applying TCI state" may be used interchangeably. A default TCI state may be accordingly used by the UE 502 at 510 or the network entity at 510 for the scheduled downlink transmission 514. As used herein, the term "default TCI state rule" or "default TCI state condition" may refer to one or more rules or conditions representing which TCI state to use in the event that a scheduling offset between DCI indicating a TCI state and a scheduled downlink transmission is smaller than a threshold. In some aspects, the UE 502 might not be able to apply the TCI state indicated in the DCI 508 for the scheduled downlink transmission 514 scheduled by the DCI 508 because the scheduling offset is smaller than the threshold, the UE 502 may apply the TCI state indicated in the DCI 507 or another TCI state. The threshold may correspond to a length of beam application time (e.g., the time duration between ACK to the DCI and the time that the TCI becomes effective).

In some aspects, the default TCI state condition may represent that the default TCI state is a TCI state associated with a CORESET ID (e.g., such as a lowest CORESET ID) in a last monitored slot. In some aspects, the default TCI state condition may represent that the default TCI state is the TCI state indicated by the DCI 507. In some aspects, the default TCI state condition may represent that the default TCI state may be the TCI state indicated by the DCI 507 or the TCI state associated with a CORESET ID (e.g., such as a lowest CORESET ID) in a last monitored slot based on a configuration 505 by the network entity 504. A TCI indicated by a DCI may take some time before it takes effect, and the later indicated TCI may replace an earlier indicated TCI after the later TCI takes effect. The default TCI is the indicated TCI which may be in effect during the slot of the scheduled PDSCH. The configuration 505 may be dynamically updated by the network entity 504. In some aspects, the default TCI state is the TCI state indicated by the DCI 507. In some aspects, the default TCI state condition may represent that the default TCI state may be the TCI state indicated by the DCI 507 or the TCI state associated with a CORESET ID (e.g., such as a lowest CORESET ID) in a last monitored slot based on one or more of: (1) information regarding the TCI state being configured in the DCI 507, (2) whether the TCI state being configured in the DCI 507 is for intra-cell or inter-cell, (3) whether the scheduled downlink transmission 514 is dedicated to the UE 502 or non-UE dedicated, or (4) whether the scheduled downlink transmission 514 is for groupcast or broadcast.

In some aspects, the default TCI state condition may be based on whether the TCI state indicated in the DCI 507 is a unified TCI state for a CC or BWP or a non-unified TCI state for the CC or BWP. In some aspects, whether the TCI state indicated in the DCI 507 is a unified TCI state or a non-unified TCI state may be determined based on signaling from the network entity 504 or based on a configuration. In some aspects, whether the TCI state indicated in the DCI 507 is a unified TCI state or a non-unified TCI state may be determined based on one or more of: (1) whether unified TCI state have been configured in RRC (e.g., joint DL/UL or UL TCI state), (2) whether a flag representing using unified TCI state (e.g., a useUnifiedTCI flag) is configured for a channel or reference signal (RS) a CORESET for the UE 502, (3) whether a reference TCI state configuration has been configured in a PDSCH configuration for the UE 502 (e.g., and the CC is not configured with a TCI state pool), (4) whether a CC list for common update of unified TCI state has been configured in RRC, and if the CC is included in the CC list, (5) whether a CC list for common update of legacy TCI state (non-unified TCI state) has been configured, and CC is included in the list. The determination may be based on the CC or the BWP associated with the DCI 507, or another CC or BWP. In some aspects, the default TCI state condition may represent that if the TCI state indicated in the DCI 507 is a unified TCI state, the TCI state indicated in the DCI 507 may be the default TCI state. In some aspects, the default TCI state condition may represent that if the TCI state indicated in the DCI 507 is a non-unified TCI state, the TCI state associated with a CORESET ID (e.g., such as a lowest CORESET ID) in a last monitored slot.

In some aspects, the default TCI state condition may be based on whether the scheduled downlink transmission 514 is for groupcast or broadcast or whether the scheduled downlink transmission 514 is dedicated to the UE 502 or non-UE dedicated. In some aspects, whether the scheduled downlink transmission 514 is dedicated to the UE 502 or non-UE dedicated may be determined by a DCI format of the DCI 507 and associated scrambled random network temporary identifier (RNTI). For example, if the DCI 507 is based on format 1_1 or format 1_2 and scrambled with cell RNTI, the scheduled downlink transmission 514 is dedicated to the UE 502. If the DCI 507 is based on another format (such as format 4_2) and scrambled with group RNTI, the scheduled downlink transmission 514 is non-UE dedicated. In some aspects, the default TCI state condition may represent that the TCI state indicated in the DCI 507 may be the default TCI state based on the scheduled downlink transmission 514 is dedicated to the UE 502. In some aspects, the default TCI state condition may represent, based on the scheduled downlink transmission 514 is not dedicated to the UE 502, a TCI state dedicated to the UE 502 may be the default TCI state or a TCI state associated with a PDCCH transmission may be the default TCI state. In some aspects, the default TCI state condition may represent, based on the scheduled downlink transmission 514 is not dedicated to the UE 502, the default TCI state may be the TCI state indicated by the DCI 507. In some aspects, the default TCI state condition may represent, based on the scheduled downlink transmission 514 is not dedicated to the UE 502, the default TCI state may be the TCI state associated with a CORESET ID (e.g., such as a lowest CORESET ID) in a last monitored slot based on a configuration 505 by the network entity 504. In some aspects, the default TCI state condition may represent, based on the scheduled downlink transmission 514 is not dedicated to the UE 502, the default TCI state may be based on a configuration by the network entity 504. In some aspects, the UE 502 is not expected to receive a non-UE dedicated channel if the source RS of the TCI state of the corresponding PDSCH is not associated with the serving cell PCI.

In some aspects, the default TCI state condition may represent, based on the scheduled downlink transmission 514 is a broadcast or groupcast PDSCH, the default TCI state may be configured by the network entity 504 for the broadcast or the groupcast PDSCH (e.g., so that the default TCI state for different UEs in the broadcast or the groupcast may be the same).

In some aspects, the default TCI state condition may be based on whether the TCI state indicated by the DCI 507 is for intra-cell or inter-cell beam management (BM). For example, the TCI state indicated by the DCI 507 may be associated with a non-serving cell RS as its source RS, and the TCI state may be configured for inter-cell beam management (e.g., such as layer 1 or layer 2 mobility). In some aspects, the default TCI state condition may represent, based on the TCI state indicated by the DCI 507 is for intra-cell, the default TCI state may be the TCI state associated with a CORESET ID (e.g., such as a lowest CORESET ID) in a last monitored slot. In some aspects, the default TCI state condition may represent, based on the TCI state indicated by the DCI 507 is for inter-cell, the default TCI state may be the TCI state indicated by the DCI 507. In some aspects, whether the TCI state indicated by the DCI 507 is configured for inter-cell or intra cell may be determined based on: (1) if no additional physical cell ID (PCI) configured for the UE 502, the TCI state indicated by the DCI 507 is configured for intra-cell, (2) if no additional PCI associated with the TCI state indicated by the DCI 507, the TCI state indicated by the DCI 507 is configured for intra-cell, (3) if no additional PCI associated with the TCI state indicated by the DCI 507, the TCI state indicated by the DCI 507 is configured for intra-cell, or (4) otherwise, the TCI state indicated by the DCI 507 is configured for inter-cell.

In some aspects, as an example, the UE 502 may behave according to: if scheduling offset is smaller than a threshold (e.g., that may be represented by a timeDurationForQCL parameter), if the indicated TCI is associated with PCI different from serving cell PCI (i.e., inter-cell), in each CC, the default TCI state may be the TCI state associated with a CORESET ID (e.g., such as a lowest CORESET ID) in a last monitored slot, for CCs in each band, if the QCL-Type D properties for default QCL assumptions of the CCs in the band are different in a slot, the default QCL assumption for the CC with lowest ID in the band may be applied to all the CCs in the band in the slot.

In some aspects, the default TCI state condition may represent that the default TCI state is a TCI state associated with a CORESET ID (e.g., such as a lowest CORESET ID)

in a last monitored slot. In some aspects, a groups of CCs in a band may be configured to share a common TCI configuration and the CCs may also share the same TCI update signaling, and the UE 502 may apply the same TCI. Therefore, it may be possible that in different CCs, based on when the last CORESET on the CC is monitored and which CORESETs are then monitored, different default TCI states may be selected for different CCs based on the default TCI state condition. For example, on CC1, the last monitored slot is slot N and CORESET1 is monitored, on CC2, the last monitored slot is slot N-5 and CORESET 2 and 3 is monitored. Therefore, CORESET1's TCI state during slot N may be the default TCI state for CC1 and CORESET 2's TCI state during slot N-5 may be the default TCI state for CC2. In some aspects, the default TCI state condition may further represent a same default TCI state may be used for all CCs based on one of: (1) use a CC with a CC ID (such as the lowest CC ID or configured by the network entity 504) to select default TCI state, and the selected default TCI state is applied to all CCs, (2) use the CC where the CORESET is lastly monitored and the monitored CORESET ID is the lowest during the last monitored occasion to select default TCI state.

In some aspects, if the MAC-CE 506 includes TCI states (such as DLorJointTCIState and/or UL-TCIState) mapped to one TCI codepoint without other TCI codepoints (e.g., the MAC-CE 506 activates one TCI state without activating other TCI states), the UE 502 may apply the activated TCI state after a certain time (e.g., 3 milliseconds after a slot including an ACK for the MAC-CE) for one or for a set of CCs/DL BWPs, and the DCI 507 or the DCI 508 may not indicate a TCI state.

FIG. 6 is a flowchart 600 of a method of wireless communication. The method may be performed by a UE (e.g., the UE 104, the UE 502; the apparatus 804).

At 602, the UE may receive DCI indicating a first TCI state from a network entity at a first time. For example, the UE 502 may receive DCI 508 indicating a first TCI state from a network entity 504 at a first time. In some aspects, 602 may be performed by the TCI component 198.

At 604, the UE may apply a second TCI state or a third TCI state to receive a scheduled downlink transmission based on a difference between the first time and a second time associated with the scheduled downlink transmission is smaller than a threshold and based on a default TCI state condition. For example, the UE 502 may apply a second TCI state (e.g., TCI state associated with a CORESET ID) or a third TCI state (e.g., TCI state associated with the DCI 507) (e.g., at 510) to receive a scheduled downlink transmission 514 based on a difference between the first time and a second time associated with the scheduled downlink transmission is smaller than a threshold and based on a default TCI state condition. In some aspects, 604 may be performed by the TCI component 198. In some aspects, the default TCI state condition may represent that applying the second TCI state or the third TCI state is based on a CORESET ID. In some aspects, the CORESET ID is: (1) configured without signaling from the network entity, (2) associated with a CC indicated by the network entity, or (3) associated with a lastly monitored CC. In some aspects, the default TCI state condition may represent applying the third TCI state. In some aspects, the default TCI state condition represents applying the third TCI state if the third TCI state is a unified TCI state associated with a configured CC or BWP and applying the second TCI state or the third TCI state based on a CORESET ID if the third TCI state is not the unified TCI state associated with the configured CC or BWP. In some aspects, the default TCI state condition may represent applying the third TCI state if the scheduled downlink transmission is dedicated to the UE as represented by on a DCI format associated with the DCI or a scrambled RNTI associated with the DCI. In some aspects, the scheduled downlink transmission is not dedicated to the UE as represented by on a DCI format associated with the DCI or a scrambled RNTI associated with the DCI, and where the default TCI state condition is RRC configured. In some aspects, the default TCI state condition may represent applying the second TCI state based on the scheduled downlink transmission being based on groupcast or broadcast, and where the second TCI state is associated with the groupcast or the broadcast. In some aspects, the default TCI state condition may be based on whether the third TCI state or the second TCI state may be associated with inter-cell or intra-cell. In some aspects, the third TCI state may be associated with the inter-cell based on the third TCI state being associated with a RS associated with a non-serving cell. In some aspects, the third TCI state or the second TCI state may be associated with the intra-cell based on one or more of: (1) a physical cell ID (PCI) not being configured with the third TCI state, (2) the PCI not being configured with an activated TCI state associated with the UE, or (3) the PCI not being separately configured in a RS. In some aspects, the UE may receive the default TCI state condition from the network entity, where the default TCI state condition may represent that applying the second TCI state or the third TCI state is based on a CORESET ID or may represent applying the third TCI state. In some aspects, the UE may receive MAC-CE (e.g., 506) activating the set of TCI states before receiving the DCI, and the UE may apply a joint TCI state or a UL TCI state in the set of TCI states based on the MAC-CE contains the joint TCI state or the UL TCI state without additional joint TCI states or additional UL TCI states.

FIG. 7 is a flowchart 700 of a method of wireless communication. The method may be performed by a network entity (e.g., the base station 102, the network entity 504, the network entity 802, the network entity 902).

At 702, the network entity may transmit DCI indicating a first TCI state for a UE at a first time. For example, the network entity 504 may transmit DCI 508 indicating a first TCI state for a UE 502 at a first time. In some aspects, 702 may be performed by the TCI component 199.

At 704, the network entity may apply a second TCI state (e.g., TCI state associated with a CORESET ID) or a third TCI state (e.g., TCI state associated with the DCI 507) to transmit a scheduled downlink transmission based on a difference between the first time and a second time associated with the scheduled downlink transmission is smaller than a threshold and based on a default TCI state condition. For example, the network entity 504 may apply a second TCI state or a third TCI state (e.g., 512) to transmit a scheduled downlink transmission based on a difference between the first time and a second time associated with the scheduled downlink transmission is smaller than a threshold and based on a default TCI state condition. In some aspects, 704 may be performed by the TCI component 199. In some aspects, the default TCI state condition may represent that applying the second TCI state or the third TCI state is based on a CORESET ID. In some aspects, the CORESET ID is: (1) configured without signaling from the network entity, (2) associated with a CC indicated by the network entity, or (3) associated with a lastly monitored CC. In some aspects, the default TCI state condition may represent applying the third TCI state. In some aspects, the default TCI state condition represents applying the third TCI state if the third TCI state is a unified TCI state associated with a configured CC or BWP and applying the second TCI state or the third TCI state based on a CORESET ID if the third TCI state is not the unified TCI state associated with the configured CC or BWP. In some aspects, the default TCI state condition may represent applying the third TCI state if the scheduled downlink transmission is dedicated to the UE as represented by on a DCI format associated with the DCI or a scrambled RNTI associated with the DCI. In some aspects, the scheduled downlink transmission is not dedicated to the UE as represented by on a DCI format associated with the DCI or a scrambled RNTI associated with the DCI, and where the default TCI state condition is RRC configured. In some aspects, the default TCI state condition may represent applying the second TCI state based on the scheduled downlink transmission being based on groupcast or broadcast, and where the second TCI state is associated with the groupcast or the broadcast. In some aspects, the default TCI state condition may be based on whether the third TCI state or the second TCI state may be associated with inter-cell or intra-cell. In some aspects, the third TCI state may be associated with the inter-cell based on the third TCI state being associated with a RS associated with a non-serving cell. In some aspects, the third TCI state or the second TCI state may be associated with the intra-cell based on one or more of: (1) a physical cell ID (PCI) not being configured with the third TCI state, (2) the PCI not being configured with an activated TCI state associated with the UE, or (3) the PCI not being separately configured in a RS. In some aspects, the network entity may transmit the default TCI state condition for the UE, where the default TCI state condition may represent that applying the second TCI state or the third TCI state is based on a CORESET ID or may represent applying the third TCI state. In some aspects, the network entity may transmit MAC-CE (e.g., 506) activating the set of TCI states before receiving the DCI.

Figure 8:
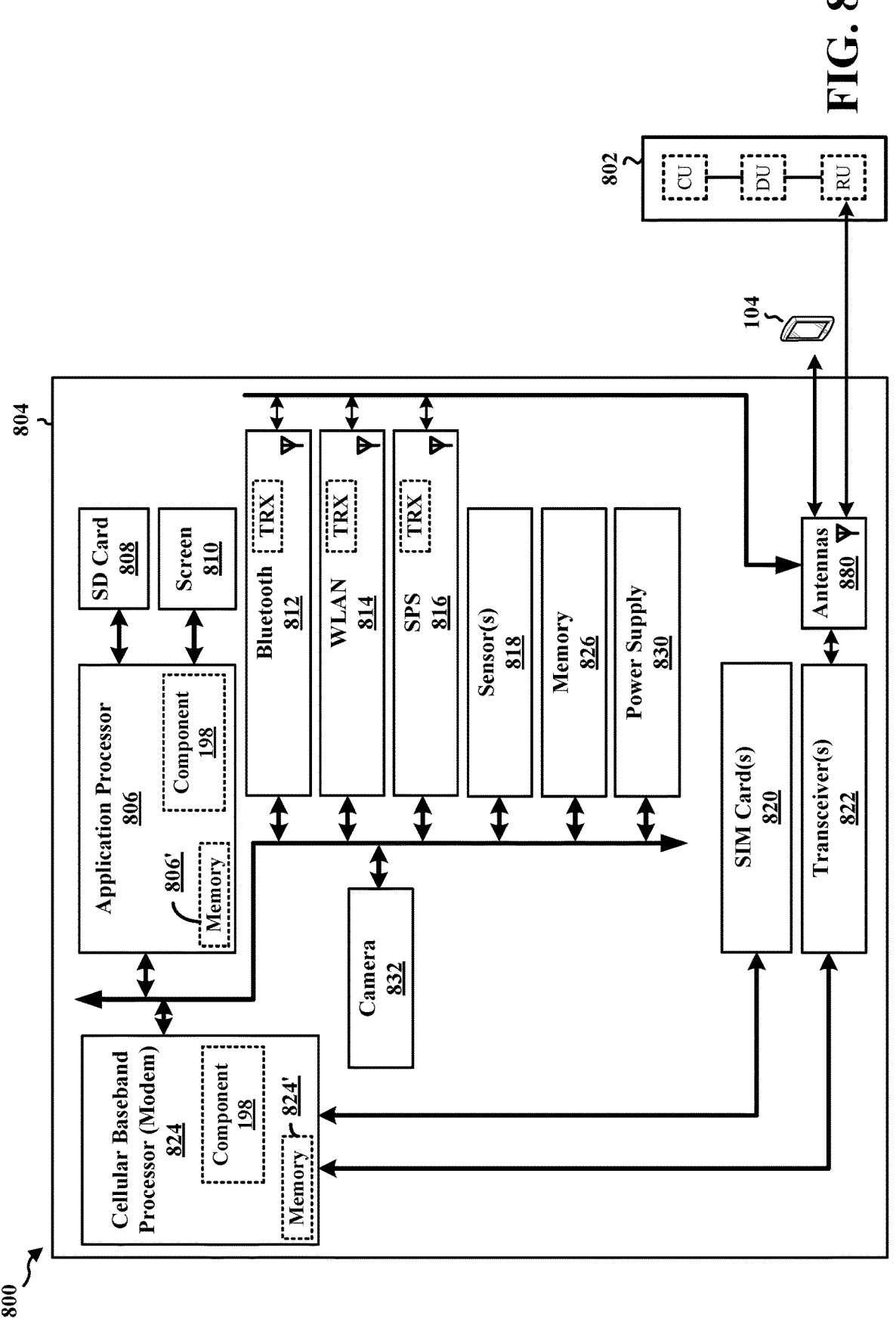
FIG. 8 is a diagram illustrating an example of a hardware implementation for an example apparatus and/or network entity.

FIG. 8 is a diagram 800 illustrating an example of a hardware implementation for an apparatus 804. The apparatus 804 may be a UE, a component of a UE, or may implement UE functionality. In some aspects, the apparatus 804 may include a cellular baseband processor 824 (also referred to as a modem) coupled to one or more transceivers 822 (e.g., cellular RF transceiver). The cellular baseband processor 824 may include on-chip memory 824'. In some aspects, the apparatus 804 may further include one or more subscriber identity modules (SIM) cards 820 and an application processor 806 coupled to a secure digital (SD) card 808 and a screen 810. The application processor 806 may include on-chip memory 806'. In some aspects, the apparatus 804 may further include a Bluetooth module 812, a WLAN module 814, a satellite system module 816 (e.g., GNSS module), one or more sensor modules 818 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 826, a power supply 830, and/or a camera 832. The Bluetooth module 812, the WLAN module 814, and the satellite system module 816 may include an on-chip transceiver (TRX)/receiver (RX). The cellular baseband processor 824 communicates through the transceiver(s) 822 via one or more antennas 880 with the UE 104 and/or with an RU associated with a network entity 802. The cellular baseband processor 824 and the application processor 806 may each include a computer-readable medium/memory 824', 806', respectively. The additional memory modules 826 may also be considered a computer-readable medium/ memory. Each computer-readable medium/memory 824', 806', 826 may be non-transitory. The cellular baseband processor 824 and the application processor 806 are each responsible for general processing, including the execution of software stored on the computer-readable medium/ memory. The software, when executed by the cellular baseband processor 824/application processor 806, causes the cellular baseband processor 824/application processor 806 to perform the various functions described herein. The computer-readable medium/memory may also be used for storing data that is manipulated by the cellular baseband processor 824/application processor 806 when executing software. The cellular baseband processor 824/application processor 806 may be a component of the UE 350 and may include the memory 360 and/or at least one of the TX processor 368, the RX processor 356, and the controller/ processor 359. In one configuration, the apparatus 804 may be a processor chip (modem and/or application) and include just the cellular baseband processor 824 and/or the application processor 806, and in another configuration, the apparatus 804 may be the entire UE (e.g., see 350 of FIG. 3) and include the additional modules of the apparatus 804.

As discussed herein, the TCI component 198 may be configured to receive downlink control information (DCI) indicating at least a first transmission configuration indicator (TCI) state from a network entity at a first time. In some aspects, the TCI component 198 may be further configured to apply a second TCI state or a third TCI state to receive a scheduled downlink transmission based on a difference between the first time and a second time associated with the scheduled downlink transmission is smaller than a threshold and based on a default TCI state condition. The TCI component 198 may be within the cellular baseband processor 824, the application processor 806, or both the cellular baseband processor 824 and the application processor 806. The TCI component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 804 may include a variety of components configured for various functions. In one configuration, the apparatus 804, and in particular the cellular baseband processor 824 and/or the application processor 806, includes means for receiving downlink control information (DCI) indicating at least a first transmission configuration indicator (TCI) state from a network entity at a first time. In some aspects, the apparatus 804 may further include means for applying a second TCI state or the third TCI state to receive a scheduled downlink transmission based on a difference between the first time and a second time associated with the scheduled downlink transmission is smaller than a threshold and based on a default TCI state condition. In some aspects, the apparatus 804 may further include means for receiving the default TCI state condition from the network entity, where the default TCI state condition may represent that applying the second TCI state or the third TCI state is based on a control resource set (CORESET) identifier (ID) or may represent applying the third TCI state. In some aspects, the apparatus 804 may further include means for receiving medium access control (MAC) control element (MAC-CE) activating the set of TCI states before receiving the DCI. In some aspects, the apparatus 804 may further include means for applying a joint TCI state or a UL TCI state in the set of TCI states based on the MAC-CE contains the joint TCI state or the UL TCI state without additional joint TCI states or additional UL TCI states. The means may be the TCI component 198 of the apparatus 804 configured to perform the functions recited by the means. As described herein, the apparatus 804 may include the TX processor 368, the RX processor 356, and the controller/processor 359. As such, in one configuration, the means may be the TX processor 368, the RX processor 356, and/or the controller/processor 359 configured to perform the functions recited by the means.

Figure 9:
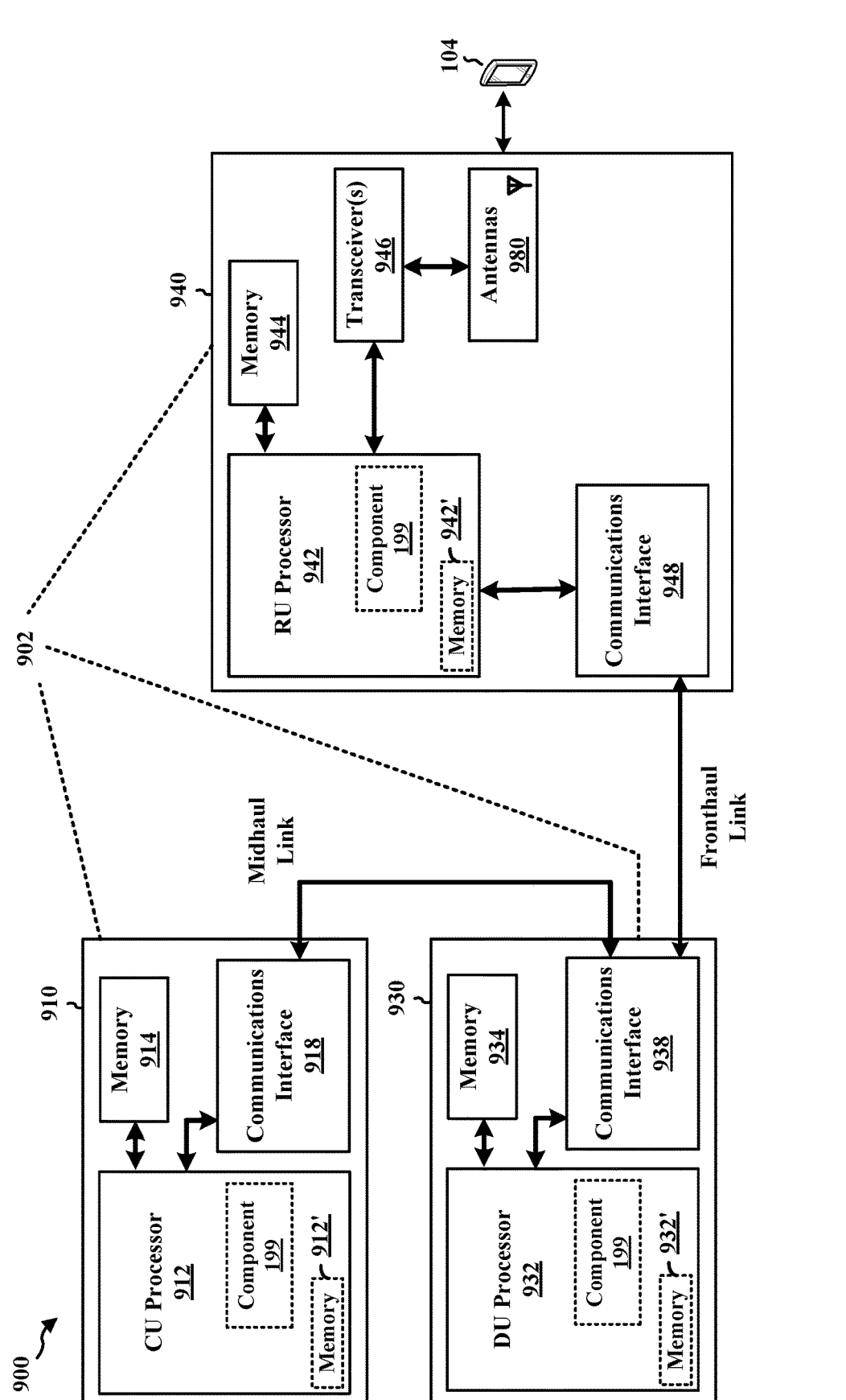
FIG. 9 is a diagram illustrating an example of a hardware implementation for an example network entity.

FIG. 9 is a diagram 900 illustrating an example of a hardware implementation for a network entity 902. The network entity 902 may be a BS, a component of a BS, or may implement BS functionality. The network entity 902 may include at least one of a CU 910, a DU 930, or an RU 940. For example, depending on the layer functionality handled by the component 199, the network entity 902 may include the CU 910; both the CU 910 and the DU 930; each of the CU 910, the DU 930, and the RU 940; the DU 930; both the DU 930 and the RU 940; or the RU 940. The CU 910 may include a CU processor 912. The CU processor 912 may include on-chip memory 912'. In some aspects, the CU 910 may further include additional memory modules 914 and a communications interface 918. The CU 910 communicates with the DU 930 through a midhaul link, such as an F1 interface. The DU 930 may include a DU processor 932. The DU processor 932 may include on-chip memory 932'. In some aspects, the DU 930 may further include additional memory modules 934 and a communications interface 938. The DU 930 communicates with the RU 940 through a fronthaul link. The RU 940 may include an RU processor 942. The RU processor 942 may include on-chip memory 942'. In some aspects, the RU 940 may further include additional memory modules 944, one or more transceivers 946, antennas 980, and a communications interface 948. The RU 940 communicates with the UE 104. The on-chip memory 912', 932', 942' and the additional memory modules 914, 934, 944 may each be considered a computer-readable medium/memory. Each computer-readable medium/memory may be non-transitory. Each of the processors 912, 932, 942 is responsible for general processing, including the execution of software stored on the computer-readable medium/memory. The software, when executed by the corresponding processor(s) causes the processor(s) to perform the various functions described herein. The computer-readable medium/memory may also be used for storing data that is manipulated by the processor(s) when executing software.

As discussed herein, the TCI component 199 may be configured to transmit downlink control information (DCI) indicating at least a first transmission configuration indicator (TCI) state for a user equipment (UE) at a first time. In some aspects, the TCI component 199 may be further configured to apply a second TCI state or the third TCI state to transmit a scheduled downlink transmission based on a difference between the first time and a second time associated with the scheduled downlink transmission is smaller than a threshold and based on a default TCI state condition. The TCI component 199 may be within one or more processors of one or more of the CU 910, DU 930, and the RU 940. The TCI component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 902 may include a variety of components configured for various functions. In one configuration, the network entity 902 includes means for transmitting downlink control information (DCI) indicating at least a first transmission configuration indicator (TCI) state for a user equipment (UE) at a first time. In some aspects, the network entity 902 may further include means for applying a second TCI state or the third TCI state to transmit a scheduled downlink transmission based on a difference between the first time and a second time associated with the scheduled downlink transmission is smaller than a threshold and based on a default TCI state condition. In some aspects, the network entity 902 may further include means for transmitting the default TCI state condition for the UE, where the default TCI state condition may represent that applying the second TCI state or the third TCI state is based on a control resource set (CORESET) identifier (ID) or may represent applying the third TCI state. In some aspects, the network entity 902 may further include means for transmitting a medium access control (MAC) control element (MAC-CE) activating the set of TCI states before receiving the DCI. The means may be the TCI component 199 of the network entity 902 configured to perform the functions recited by the means. As described herein, the network entity 902 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is an apparatus for wireless communication at a user equipment (UE), including: a memory; and at least one processor coupled to the memory, where the at least one processor is configured to: receive downlink control information (DCI) indicating a first transmission configuration indicator (TCI) state from a network entity at a first time; and apply a second TCI state or a third TCI state to receive a scheduled downlink transmission based on a difference between the first time and a second time associated with the scheduled downlink transmission, where the difference is smaller than a threshold and based on a default TCI state condition.

Aspect 2 is the apparatus of aspect 1, where the default TCI state condition represents that applying the second TCI state or the third TCI state is based on a control resource set (CORESET) identifier (ID).

Aspect 3 is the apparatus of any of aspects 1-2, where the CORESET ID is: (1) configured without signaling from the network entity, (2) associated with a component carrier (CC) indicated by the network entity, or (3) associated with a most recently monitored CC.

Aspect 4 is the apparatus of any of aspects 1-3, where the default TCI state condition represents applying the third TCI state, where the third TCI state is indicated before the DCI.

Aspect 5 is the apparatus of any of aspects 1-4, where the at least one processor is configured to: receive the default TCI state condition from the network entity, where the default TCI state condition represents that applying the second TCI state or the third TCI state is based on a control resource set (CORESET) identifier (ID) or represents applying the third TCI state.

Aspect 6 is the apparatus of any of aspects 1-5, where the default TCI state condition represents applying the third TCI state if the third TCI state is a unified TCI state associated with a configured component carrier (CC) or a configured bandwidth part (BWP) and applying the second TCI state or the third TCI state based on a control resource set (CORE-SET) identifier (ID) if the third TCI state is not the unified TCI state associated with the configured CC or the configured BWP, and where the third TCI state is the unified TCI state based on at least one of: (1) whether the unified TCI state is configured in radio resource control (RRC), (2) whether a flag representing the unified TCI state is configured for a channel or a reference signal associated with the CORESET, (3) whether a reference TCI state configuration is configured in a physical downlink shared channel configuration (PDSCH) for the UE, (4) whether a first CC list for common update of the unified TCI state is configured in the RRC, or (5) whether a second CC list for common update of non-unified TCI state including the CC is configured.

Aspect 7 is the apparatus of any of aspects 1-6, where the default TCI state condition represents applying the third TCI state if the scheduled downlink transmission is dedicated to the UE as represented by a DCI format associated with the DCI or a scrambled random network temporary identifier (RNTI) associated with the DCI.

Aspect 8 is the apparatus of any of aspects 1-7, where the scheduled downlink transmission is not dedicated to the UE as represented by a DCI format associated with the DCI or a scrambled random network temporary identifier (RNTI) associated with the DCI, and where the default TCI state condition is radio resource control (RRC) configured.

Aspect 9 is the apparatus of any of aspects 1-8, where the default TCI state condition represents applying the second TCI state based on the scheduled downlink transmission being based on groupcast or broadcast, and where the second TCI state is associated with the groupcast or the broadcast.

Aspect 10 is the apparatus of any of aspects 1-9, where the default TCI state condition is based on whether the third TCI state or the second TCI state is associated with inter-cell beam management or intra-cell beam management.

Aspect 11 is the apparatus of any of aspects 1-10, where the third TCI state is associated with the inter-cell beam management based on the third TCI state being associated with a reference signal (RS) associated with a non-serving cell.

Aspect 12 is the apparatus of any of aspects 1-11, where the third TCI state or the second TCI state is associated with the intra-cell beam management based on one or more of: (1) a physical cell ID (PCI) not being configured with the third TCI state, (2) the PCI not being configured with an activated TCI state associated with the UE, or (3) the PCI not being separately configured in a reference signal (RS).

Aspect 13 is the apparatus of any of aspects 1-12, where the DCI indicates the third TCI state in a set of TCI states, and where the at least one processor is further configured to: receive a medium access control (MAC) control element (MAC-CE) activating the set of TCI states before receiving the DCI; and apply a joint TCI state or a UL TCI state in the set of TCI states based on the MAC-CE containing the joint TCI state or the UL TCI state without additional joint TCI states or additional UL TCI states.

Aspect 14 is the apparatus of any of aspects 1-13, further including a transceiver or an antenna coupled to the at least one processor, and where the transceiver or the antenna is configured to receive the DCI.

Aspect 15 is an apparatus for wireless communication at a network entity, including: a memory; and at least one processor coupled to the memory, where the at least one processor is configured to: transmit downlink control information (DCI) indicating a first transmission configuration indicator (TCI) state for a user equipment (UE) at a first time; and apply a second TCI state or a third TCI state to transmit a scheduled downlink transmission based on a difference between the first time and a second time associated with the scheduled downlink transmission, where the difference is smaller than a threshold and based on a default TCI state condition.

Aspect 16 is the apparatus of aspect 15, where the default TCI state condition represents that applying the second TCI state or the third TCI state is based on a control resource set (CORESET) identifier (ID).

Aspect 17 is the apparatus of any of aspects 15-16, where the CORESET ID is: (1) configured without signaling from the network entity, (2) associated with a component carrier (CC) indicated by the network entity, or (3) associated with a most recently monitored CC.

Aspect 18 is the apparatus of any of aspects 15-17, where the default TCI state condition represents applying the third TCI state, where the third TCI state is indicated before the DCI.

Aspect 19 is the apparatus of any of aspects 15-18, where the at least one processor is configured to: transmit the default TCI state condition for the UE, where the default TCI state condition represents that applying the second TCI state or the third TCI state is based on a control resource set (CORESET) identifier (ID) or represents applying the third TCI state.

Aspect 20 is the apparatus of any of aspects 15-19, where the default TCI state condition represents applying the third TCI state if the third TCI state is a unified TCI state associated with a configured component carrier (CC) or a configured bandwidth part (BWP) and applying the second TCI state or the third TCI state based on a control resource set (CORESET) identifier (ID) if the third TCI state is not the unified TCI state associated with the configured CC or the configured BWP, and where the third TCI state is the unified TCI state based on at least one of: (1) whether the unified TCI state is configured in radio resource control (RRC), (2) whether a flag representing the unified TCI state is configured for a channel or a reference signal associated with the CORESET, (3) whether a reference TCI state configuration is configured in a physical downlink shared channel configuration (PDSCH) for the UE, (4) whether a first CC list for common update of the unified TCI state is configured in the RRC, or (5) whether a second CC list for common update of non-unified TCI state including the CC is configured.

Aspect 21 is the apparatus of any of aspects 15-20, where the default TCI state condition represents applying the third TCI state if the scheduled downlink transmission is dedicated to the UE as represented by a DCI format associated with the DCI or a scrambled random network temporary identifier (RNTI) associated with the DCI.

Aspect 22 is the apparatus of any of aspects 15-21, where the scheduled downlink transmission is not dedicated to the UE as represented by a DCI format associated with the DCI or a scrambled random network temporary identifier (RNTI) associated with the DCI, and where the default TCI state condition is radio resource control (RRC) configured.

Aspect 23 is the apparatus of any of aspects 15-22, where the default TCI state condition represents applying the second TCI state based on the scheduled downlink transmission being based on groupcast or broadcast, and where the second TCI state is associated with the groupcast or the broadcast.

Aspect 24 is the apparatus of any of aspects 15-22, where the default TCI state condition is based on whether the third TCI state or the second TCI state is associated with inter-cell beam management or intra-cell beam management.

Aspect 25 is the apparatus of any of aspects 15-24, where the third TCI state is associated with the inter-cell beam management based on the third TCI state being associated with a reference signal (RS) associated with a non-serving cell.

Aspect 26 is the apparatus of any of aspects 15-25, where the third TCI state or the second TCI state is associated with the intra-cell beam management based on one or more of: (1) a physical cell ID (PCI) not being configured with the third TCI state, (2) the PCI not being configured with an activated TCI state associated with the UE, or (3) the PCI not being separately configured in a reference signal (RS).

Aspect 27 is the apparatus of any of aspects 15-26, where the DCI indicates the third TCI state in a set of TCI states, and where the at least one processor is further configured to transmit a medium access control (MAC) control element (MAC-CE) activating the set of TCI states before transmitting the DCI.

Aspect 28 is the apparatus of any of aspects 15-27, further including a transceiver or an antenna coupled to the at least one processor, and where the transceiver or the antenna is configured to transmit the DCI.

Aspect 29 is a method of wireless communication for implementing any of aspects 1 to 14.

Aspect 30 is an apparatus for wireless communication including means for implementing any of aspects 1 to 14.

Aspect 31 is a computer-readable medium storing computer executable code, where the code when executed by a processor causes the processor to implement any of aspects 1 to 14.

Aspect 32 is a method of wireless communication for implementing any of aspects 15 to 28.

Aspect 33 is an apparatus for wireless communication including means for implementing any of aspects 15 to 28.

Aspect 34 is a computer-readable medium storing computer executable code, where the code when executed by a processor causes the processor to implement any of aspects 15 to 28.

What is claimed is:

1. An apparatus for wireless communication at a user equipment (UE), comprising:
  memory; and
  at least one processor coupled to the memory, wherein the at least one processor is configured to:
    receive downlink control information (DCI) indicating a first TCI state from a network entity at a first time; and
    apply a second TCI state or the first TCI state to receive a scheduled downlink transmission based on a difference between the first time and a second time associated with the scheduled downlink transmission and based on a physical cell identifier (PCI) associated with the first TCI state being different from a current serving cell associated with the UE, wherein whether to apply the first TCI state or the second TCI state is based on whether the difference is smaller than a threshold and based on a default TCI state condition, wherein the second TCI state is associated with a lowest control resource set (CORESET) identifier (ID) in a last monitored slot.

2. The apparatus of claim 1, wherein the at least one processor is further configured to: receive a medium access control (MAC) control element (MAC-CE) activating a set of TCI states before reception of the DCI.

3. The apparatus of claim 2, wherein the CORESET ID is: (1) configured without signaling from the network entity, (2)

associated with a component carrier (CC) indicated by the network entity, or (3) associated with a most recently monitored CC.

4. The apparatus of claim 1, wherein the default TCI state condition represents applying the first TCI state, wherein the first TCI state is indicated before the DCI.

5. The apparatus of claim 1, wherein the at least one processor is configured to:

receive the default TCI state condition from the network entity, wherein the default TCI state condition represents that applying the second TCI state or the first TCI state is based on a control resource set (CORESET) identifier (ID) or represents applying the first TCI state.

6. The apparatus of claim 1, wherein the default TCI state condition represents applying the first TCI state if the scheduled downlink transmission is dedicated to the UE as represented by a DCI format associated with the DCI or a scrambled random network temporary identifier (RNTI) associated with the DCI.

7. The apparatus of claim 1, wherein the scheduled downlink transmission is not dedicated to the UE as represented by a DCI format associated with the DCI or a scrambled random network temporary identifier (RNTI) associated with the DCI, and wherein the default TCI state condition is radio resource control (RRC) configured.

8. The apparatus of claim 1, wherein the default TCI state condition represents applying the second TCI state based on the scheduled downlink transmission being based on groupcast or broadcast, and wherein the second TCI state is associated with the groupcast or the broadcast.

9. The apparatus of claim 1, wherein the default TCI state condition is based on whether the first TCI state or the second TCI state is associated with inter-cell beam management or intra-cell beam management.

10. The apparatus of claim 9, wherein the first TCI state is associated with the inter-cell beam management based on the first TCI state being associated with a reference signal associated with a non-serving cell.

11. The apparatus of claim 10, wherein the first TCI state or the second TCI state is associated with the intra-cell beam management based on one or more of: (1) the PCI not being configured with the first TCI state, (2) the PCI not being configured with an activated TCI state associated with the UE, or (3) the PCI not being separately configured in a reference signal.

12. The apparatus of claim 9, wherein the first TCI state or the second TCI state is associated with the intra-cell beam management based on one or more of: (1) the PCI not being configured with the first TCI state, (2) the PCI not being configured with an activated TCI state associated with the UE, or (3) the PCI not being separately configured in a reference signal (RS).

13. The apparatus of claim 1, wherein the default TCI state condition represents applying the first TCI state if the first TCI state is a unified TCI state associated with a configured component carrier (CC) or a configured bandwidth part (BWP) and applying the second TCI state or the first TCI state if the first TCI state is not the unified TCI state associated with the configured CC or the configured BWP, and wherein the first TCI state is the unified TCI state based on at least one of: (1) whether the unified TCI state is configured in radio resource control (RRC), (2) whether a flag representing the unified TCI state is configured for a channel or a reference signal associated with the CORESET, (3) whether a reference TCI state configuration is configured in a physical downlink shared channel configuration (PDSCH) for the UE, (4) whether a first CC list for common update of the unified TCI state is configured in the RRC, or (5) whether a second CC list for common update of non-unified TCI state including the CC is configured, and further comprising a transceiver or an antenna coupled to the at least one processor, and wherein the transceiver or the antenna is configured to receive the DCI.

14. An apparatus for wireless communication at a network entity, comprising:

memory; and at least one processor coupled to the memory, wherein the at least one processor is configured to:

transmit a medium access control (MAC) control element (MAC-CE) activating a set of transmission configuration indicator (TCI) states before transmission of a downlink control information (DCI) indicating a first TCI state;

transmit the DCI indicating the first TCI state for a user equipment (UE) at a first time; and apply a second TCI state or a third TCI state to transmit a scheduled downlink transmission based on a difference between the first time and a second time associated with the scheduled downlink transmission and based on a physical cell identifier (PCI) associated with the first TCI state being different from a current serving cell associated with the UE, wherein whether to apply the first TCI state or the second TCI state is based on whether the difference is smaller than a threshold and based on a default TCI state condition, and wherein the second TCI state is associated with a lowest control resource set (CORESET) identifier (ID) in a last monitored slot.

15. The apparatus of claim 14, wherein the default TCI state condition represents that applying the second TCI state or the third TCI state is based on a control resource set (CORESET) identifier (ID).

16. The apparatus of claim 15, wherein the CORESET ID is: (1) configured without signaling from the network entity, (2) associated with a component carrier (CC) indicated by the network entity, or (3) associated with a most recently monitored CC.

17. The apparatus of claim 14, wherein the default TCI state condition represents applying the third TCI state, wherein the third TCI state is indicated before the DCI.

18. The apparatus of claim 14, wherein the at least one processor is configured to:

transmit the default TCI state condition for the UE, wherein the default TCI state condition represents that applying the second TCI state or the third TCI state is based on a control resource set (CORESET) identifier (ID) or represents applying the third TCI state.

19. The apparatus of claim 14, wherein the default TCI state condition represents applying the third TCI state if the scheduled downlink transmission is dedicated to the UE as represented by a DCI format associated with the DCI or a scrambled random network temporary identifier (RNTI) associated with the DCI.

20. The apparatus of claim 14, wherein the scheduled downlink transmission is not dedicated to the UE as represented by a DCI format associated with the DCI or a scrambled random network temporary identifier (RNTI) associated with the DCI, and wherein the default TCI state condition is radio resource control (RRC) configured.

21. The apparatus of claim 14, wherein the default TCI state condition represents applying the second TCI state based on the scheduled downlink transmission being based on groupcast or broadcast, and wherein the second TCI state is associated with the groupcast or the broadcast.

22. The apparatus of claim 14, wherein the default TCI state condition is based on whether the third TCI state or the second TCI state is associated with inter-cell beam management or intra-cell beam management.

23. The apparatus of claim 22, wherein the third TCI state is associated with the inter- cell beam management based on the third TCI state being associated with a reference signal (RS) associated with a non-serving cell.

24. The apparatus of claim 22, wherein the third TCI state or the second TCI state is associated with the intra-cell beam management based on one or more of: (1) the PCI not being configured with the third TCI state, (2) the PCI not being configured with an activated TCI state associated with the UE, or (3) the PCI not being separately configured in a reference signal (RS).

25. The apparatus of claim 14, further comprising a transceiver or an antenna coupled to the at least one processor, and wherein the transceiver or the antenna is configured to transmit the DCI.

26. A method of wireless communication at a user equipment (UE), comprising:

receiving a medium access control (MAC) control element (MAC-CE) activating a set of transmission configuration indicator (TCI) states before reception of a downlink control information (DCI) indicating a first TCI state;

receiving the first TCI state from a network entity at a first time; and applying a second TCI state or the first TCI state to receive a scheduled downlink transmission based on a difference between the first time and a second time associated with the scheduled downlink transmission and based on a physical cell identifier (PCI) associated with the first TCI state being different from a current serving cell associated with the UE, wherein whether to apply the first TCI state or the second TCI state is based on whether the difference is smaller than a threshold and based on a default TCI state condition, and wherein the second TCI state is associated with a lowest control resource set (CORESET) identifier (ID) in a last monitored slot.

27. A method of wireless communication at a network entity, comprising:

transmitting a medium access control (MAC) control element (MAC-CE) activating a set of transmission configuration indicator (TCI) states before transmission of a downlink control information (DCI) indicating a first TCI state;

transmitting the first TCI state for a user equipment (UE) at a first time; and applying a second TCI state or a third TCI state to transmit a scheduled downlink transmission based on a difference between the first time and a second time associated with the scheduled downlink transmission and based on a physical cell identifier (PCI) associated with the first TCI state being different from a current serving cell associated with the UE, wherein whether to apply the first TCI state or the second TCI state is based on whether the difference is smaller than a threshold and based on a default TCI state condition, and wherein the second TCI state is associated with a lowest control resource set (CORESET) identifier (ID) in a last monitored slot.

* * * * *